United States Patent
Kalasapur et al.

(10) Patent No.: US 8,538,948 B2
(45) Date of Patent: *Sep. 17, 2013

(54) PERSONAL MASHUPS

(75) Inventors: Swaroop S. Kalasapur, Santa Clara, CA (US); Doreen Cheng, San Jose, CA (US); Yu Song, Pleasanton, CA (US); Sangoh Jeong, Palo Alto, CA (US)

(73) Assignee: Samsung Electronics Co., Ltd, Suwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/347,594

(22) Filed: Jan. 10, 2012

(65) Prior Publication Data

US 2012/0117073 A1    May 10, 2012

Related U.S. Application Data

(63) Continuation of application No. 12/400,687, filed on Mar. 9, 2009, now Pat. No. 8,117,180.

(60) Provisional application No. 61/086,751, filed on Aug. 6, 2008.

(51) Int. Cl.
*G06F 17/30* (2006.01)
*G06F 17/00* (2006.01)

(52) U.S. Cl.
USPC ........... 707/708; 707/711; 707/706; 707/741; 709/207; 341/83; 705/344

(58) Field of Classification Search
USPC ................. 707/708, 711, 706, 741; 709/207; 341/83; 701/208; 705/344
See application file for complete search history.

(56) References Cited

U.S. PATENT DOCUMENTS

| | | |
|---|---|---|
| 6,184,823 B1 | 2/2001 | Smith et al. |
| 6,278,939 B1 | 8/2001 | Robare et al. |
| 7,552,170 B2 | 6/2009 | Owen et al. |
| 7,899,803 B2 | 3/2011 | Cotter et al. |
| 2008/0320381 A1* | 12/2008 | Sercel ............ 715/234 |

OTHER PUBLICATIONS

IBM Damia (http://services.alphaworks.ibm.com/damia/) Aug. 26, 2008, 1 Page.
Google Mashup Editor (http://code.google.com/gme/) Jan. 14, 2009, 2 Pages.
BaeBo (http://baebo.francisshanahan.com/) Downloaded on Mar. 9, 2009, 4 Pages.
Xuanzhe et al., "Towards Service Composition Based on Mashup", Services, 2007 IEEE Congress on (2007), pp. 332-339.

\* cited by examiner

*Primary Examiner* — Yicun Wu
(74) *Attorney, Agent, or Firm* — Kenneth L. Sherman, Esq.; Michael Zarrabian, Esq.; Sherman & Zarrabian LLP

(57) ABSTRACT

In a first embodiment of the present invention, a method for automated creation of a mashup is provided, the method comprising: receiving data needs of a user; identifying sources of data to satisfy the data needs by comparing the data needs to available data sources; retrieving metadata relating to the identified sources of data from a source metadata store; identifying services to satisfy the data needs by comparing the retrieved metadata to available services; retrieving metadata related to the identified services from a service metadata store; and generating a plan for supplying data from the identified sources of data to the identified services based on the retrieved metadata from the source metadata source and the retrieved metadata from the service metadata source.

21 Claims, 7 Drawing Sheets

| Source | | | | | Types | | | | | |
|---|---|---|---|---|---|---|---|---|---|---|
| Address book | Contact | | | | location | | | | email | phone |
| Song list | | | | | | tag | artist | album | | |
| video list | | | | | | tag | artist | album | | |
| Calendar | Date | Contact | time | subject | [location] | | | | | |
| task list | Date | | time | subject | [location] | | | | | |
| photos/videos | Date | | time | | [location] | tag | | | | |
| alarm | Date | | time | subject | | tag | | | | |
| gps/celltower, etc | | | | | location | | | | | |
| call-log | Date | Contact | time | | location | | | | | |
| Outlook | Date | Contact | time | subject | [location] | | | | email | phone |
| SMS | date | Contact | time | subject | [location] | | | | | |
| Profile-log | Date | | time | | [location] | | | | | |
| browser-log | Date | | time | | [location] | text/tag | | | | url |
| IM | Date | Contact | time | | [location] | text | | | | |
| photos | Date | | time | | location | text/tag | | | | |
| music-history | Date | | time | | [location] | text/tag | artist | album | | |
| video-history | Date | | time | | [location] | text/tag | | album | | |
| RSS feeds | date | | time | subject | [location] | text/tag | | | | url |

Data sources from the Internet.

| Source | | | | Types | | | |
|---|---|---|---|---|---|---|---|
| Movies | genere | actors | showtime | location | rating | year | |
| Housing | price | location | features | | | | |
| Automotive | price | year | make | model | milage | rating | history |
| air-travel | price | airline | date | time | location | | |
| ... | | | | | | | |
| ... | | | | | | | |

Table 1. Example of Personal metadata store.

| Service | Data types | Location | Access details |
|---|---|---|---|
| Google maps | Geo coordinates, physical address, ... | mps.google.com | Google map API |
| Timeline viewer | Timestamp, event tags, ... | Smile.mit.edu/timeline | Timeline api |
| Graph visualizer | People, connections, popularity score, ... | | Graph visualizer api |
| ... | ... | ... | ... |

Table 2. Example of data stored within the service metadata store.

FIG. 2

PERSONAL MASHUPS

CROSS REFERENCE TO RELATED APPLICATIONS

This application is a continuation of co-pending U.S. patent application Ser. No. 12/400,687, filed on Mar. 9, 2009, which claims priority to U.S. Provisional Patent Application No. 61/086,751, filed on Aug. 6, 2008, both of which are incorporated herein by reference in their entirety for all purposes.

BACKGROUND OF THE INVENTION

1. Field of the Invention

The present invention relates generally to computers. More specifically, the present invention relates to personal mashups in computer systems.

2. Description of the Related Art

A mashup is a web application that combines data from more than one source into a single integrated tool. The term "mashup" implies integration, frequently done by access to open APIs and data sources to produce results that were not the original goal of the data owners. An example is the use of cartographic data from Google Maps to add location information to real-estate data, thereby creating a new and distinct web service that was not originally provided by either source.

There have been a number of such mashups created for sources that are available on the Internet. In most cases, the results of mashups are consumed as web pages by end users, although there are other mechanisms such as desktop widgets that are popular. (Widgets are another type of mashup client, apart from the browser. They are dedicated mashup apps.)

The existing mashup techniques concentrate on fusing information from multiple data sources on the Internet and presenting them to users in new, interesting ways. In the current state of the art, mashups are typically developed by skilled people and consumed by others. It is necessary to have at least minimal programming abilities in order to create a mashup and, to benefit from a particular mashup service, a user must know about the service and/or must first find the service before using it in the mashup. In addition, current mashup techniques are targeted at commonly-used services. On the other hand, individuals typically have various information needs in various situations. Moreover, when the needs/wants arise, a user often needs/wants the information at the very instant. Currently there are no mashup techniques that allow for the serving of such just-in-time personal information needs.

SUMMARY OF THE INVENTION

In a first embodiment of the present invention, a method for automated creation of a mashup is provided, the method comprising: receiving data needs of a user; identifying sources of data to satisfy the data needs by comparing the data needs to available data sources; retrieving metadata relating to the identified sources of data from a source metadata store; identifying services to satisfy the data needs by comparing the retrieved metadata to available services; retrieving metadata related to the identified services from a service metadata store; and generating a plan for supplying data from the identified sources of data to the identified services based on the retrieved metadata from the source metadata source and the retrieved metadata from the service metadata source.

In a second embodiment of the present invention, an apparatus is provided comprising: a source metadata store; a service metadata store; a service engine coupled to the source metadata store and the service metadata store; and a service actuator coupled to the service engine, the source metadata store, and the service metadata store.

In a third embodiment of the present invention, an apparatus is provided for automated creation of a mashup, the apparatus comprising: means for receiving data needs of a user; means for identifying sources of data to satisfy the data needs by comparing the data needs to available data sources; means for retrieving metadata relating to the identified sources of data from a source metadata store; means for identifying services to satisfy the data needs by comparing the retrieved metadata to available services; means for retrieving metadata related to the identified services from a service metadata store; and means for generating a plan for supplying data from the identified sources of data to the identified services based on the retrieved metadata from the source metadata source and the retrieved metadata from the service metadata source.

BRIEF DESCRIPTION OF THE DRAWINGS

FIG. 2 is a diagram illustrating a table illustrating an example of a personal metadata store and a table illustrating an example of data stored within a service metadata store in accordance with an embodiment of the present invention.

DETAILED DESCRIPTION OF SPECIFIC EMBODIMENTS

Figure 1:
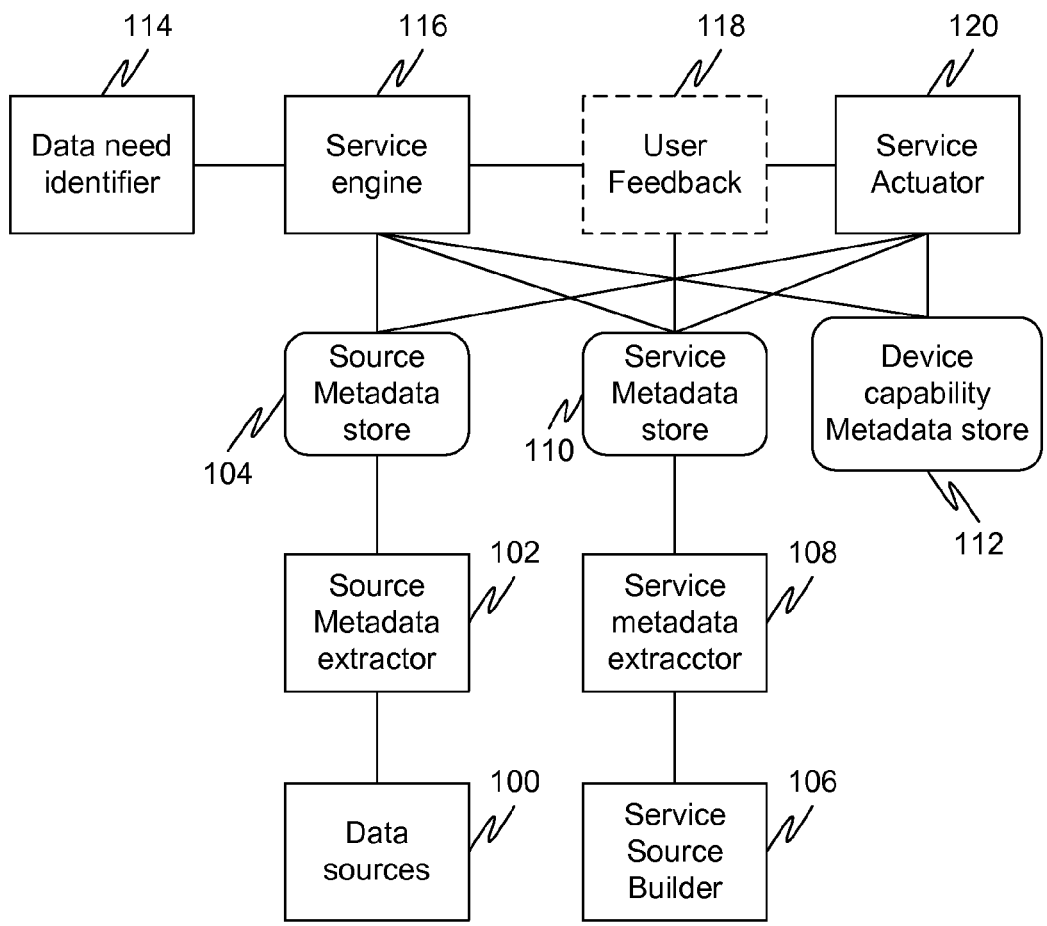
FIG. 1 is a block diagram illustrating an architecture in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

As an example of the need for the present invention, consider a user who wants to obtain information about movie shows that are playing near the hotel he/she is staying the coming week, with directions to get to that particular place. The current mechanism to accomplish this is to lookup multiple, separate services including: (1) The user will have to provide the address information to a movie database service (such as Yahoomovies.com) (2) Based on the gathered results, the user will have to use a mapping service to get the directions to that place.

Using a current mashup service, the user will have to be able to program the mashup service to take the address information from the movie database service and serve it to the mapping service. The user also has to know at the time of programming the precise location of the movie database service and mapping service in order to set up the proper mashup services.

The present invention addresses the above problem by providing a way of delivering personalized mashup services at the time of the needs/wants without requiring the knowledge of needed services or requiring search for such services. This invention provides ways for using user's personal data stored in the Internet or personal devices with existing services to realize new mashup services tailored to the user's needs.

In an embodiment of the present invention, metadata of various data sources is automatically extracted. Metadata from various Internet services is also automatically extracted. Then, the personal mashup is able to identify the data sources that can be used as input a just-in-time mashup service that will produce user specified needed data visualization. A mechanism for constructing the just-in-time mashup service using existing services is provided as well as a mechanism for actuating the just-in-time mashup service.

FIG. 1 is a block diagram illustrating an architecture in accordance with an embodiment of the present invention. Data sources 100 are the data sources available from the user's perspective. Any data that can be used by an external service can be identified as a data source. Examples of some of the common data sources include the user's address book data, user's contact list, IM log, picture library, song library, favorites list, etc., along with data that are available on the Internet such as housing information, movie information, flight schedule, etc. Typically these data sources are semi-structured in nature, meaning that they have metadata that defines their form. These data sources can either be pre-determined, or they can be automatically detected.

The source metadata extractor 102 is responsible for identifying information about data sources that can be used to provide dynamic mashups. For example, the information that can be extracted about the contact list data source includes person names, contact descriptions, geographical addresses. Similarly, for the user's picture collection, the details can be location where the picture was taken, tags associated with the picture, date the picture was taken, etc. For web based sources, for example if we consider housing data, the Source metadata extractor can identify house type, location (geo-coordinates), price range, etc. Some of these sources might need to be identified prior to extraction. Some of the sources might contain meta data that describes the corresponding data (such as through an Extensible Markup Language (XML) specification), which can be used by the source metadata extractor to identify and extract the nature of metadata.

Most available data sources have descriptions associated with them (for example, pictures, songs, etc), and/or they are semi-structured in nature (for example, user's address book data). The Source metadata extractor is equipped with mechanisms to identify various details about the data and classify them into various pre-defined categories. For example, the address book data source may be identified as providing data in (at least) three different categories (person, contact description, geographical address).

The result of analysis by the Source metadata extractor is stored in a convenient form within the Source metadata store 104. An example of such storage can be in a tabular form as shown in table 1 of FIG. 2.

The service source builder 106 is responsible for identifying various services that can be used by the user. The service source builder 106 can identify services available (e.g., on the Internet, local network, local device, etc) and has the capability to extract service descriptions. These service descriptions can either be obtained directly from the services (as available through service discovery mechanisms) or they can be manually configured by a designer. The service descriptions may contain details such as the location of the service, access mechanism, details about input and output, etc.

The services identified through the service source builder are analyzed in the service metadata extractor 108 to extract details about the service. The metadata to be extracted from the services can be pre-configured at the service metadata extractor 108, or can be dynamically determined (through user interaction, for example). The service descriptions are analyzed to identify the types of data that can be consumed by each service, the access mechanism for each service, and such details of the service.

The service metadata store 110 is a repository that contains the result of analysis by Service metadata extractor. An example storage format is shown in table 2 of FIG. 2. The repository contains information on the type of data that each service can handle, the location of the service, the access mechanism, etc.

Users can access the services though multiple devices. Based on the capabilities of each device, the choice of service, and the choice of data can vary. The device capability descriptions provide details about the user devices that help in filtering the choice among data and services. These descriptions may be stored in the device capability metadata store 112.

The needs of the user are captured through the data need identifier 114. The user intent can be conveyed to the data need identifier by a user interface that allows users to choose from multiple data and services, or an application designed to consume multiple data and services can express its needs to the data need identifier. The data needs identifier 114 supplies these needs to the Service engine 116.

The service engine 116 is responsible for analyzing the data needs and arriving at an appropriate plan for facilitating the need. The service engine 116 has access to the source metadata store 104, the service metadata store 110 and the device capability metadata store 112. The service engine 116 is capable of identifying the nature of the data from the expressed needs, and identifying services that can be used to facilitate the need. As an example, the service plan can be generated by the process depicted in FIG. 5, which will be described later. A plan can also be generated by iteratively matching the various details of the needed data (ex: location, person, time, etc) with the known data sources and the services that can produce the data in each iteration until every needed data can be produced by a source. This can be accomplished through a simple lookup on the tables 1 and 2 of FIG. 2. The generated plan for accomplishing user needs is then sent out of the service engine. For example, if the data needs are specified with an Instant Messaging (IM) log and song list as the data sources, a new plan can be identified as a timeline visualizer that plots the IM log and the log of listened songs with the help of timeline viewer.

An optional user feedback 118 component is responsible for getting the user feedback on the generated plan from the service engine 116. A simple user feedback component can be realized through a User interface that displays the plan and requests the user to approve it.

The plan generated by the service engine 116 is executed by the service actuator 120. The service actuator 120 looks at the generated plan and identifies the required access mechanisms for the involved services and invokes the services. The service actuator 120 draws the detailed service invocation information from the service metadata store 110. The required data is also supplied to the services by the service actuator 120 by contacting the source metadata store 104.

The entire system described above can be realized on a single device or can be provided as a service through various implementations. Irrespective of the mechanisms involved the following flow charts depict the steps involved in provisioning various embodiments of the invention.

Figure 3:
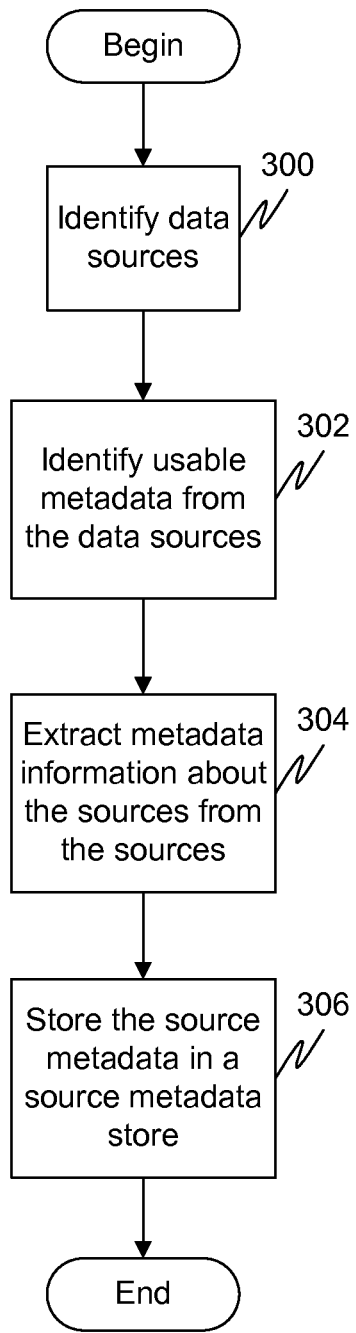
FIG. 3 is a flow diagram illustrating a method for extracting personal metadata from data source in accordance with an embodiment of the present invention.

FIG. 3 is a flow diagram illustrating a method for extracting personal metadata from data source in accordance with an embodiment of the present invention. At 300, data sources are identified. At 302, usable metadata is identified from the data sources. At 304, metadata information about the sources is extracted from the sources. At 306, the source metadata is stored in a source metadata store.

Figure 4:
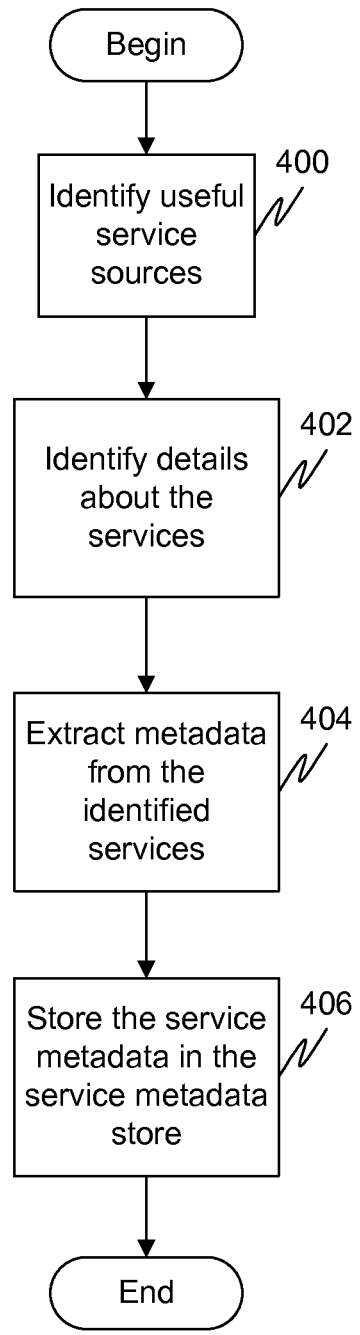
FIG. 4 is a flow diagram illustrating a method for extracting service metadata from services in accordance with an embodiment of the present invention.

FIG. 4 is a flow diagram illustrating a method for extracting service metadata from services in accordance with an embodiment of the present invention. At 400, useful service sources are identified. At 402, details are identified about the services. At 404, metadata is extracted from the identified services. At 406, the service metadata is stored in the service metadata store.

Figure 5:
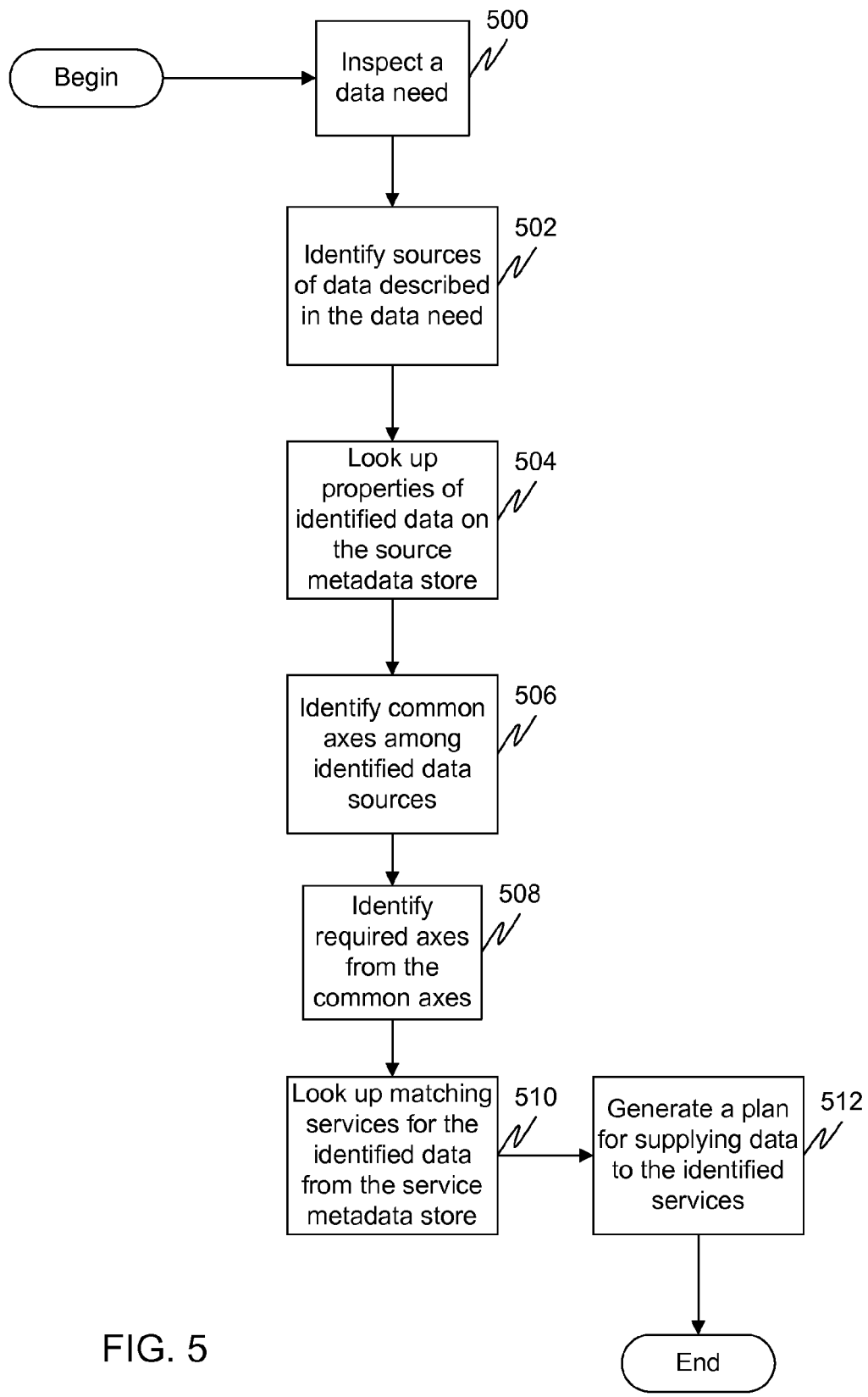
FIG. 5 is a flow diagram illustrating a method for generating a service plan from data needs in accordance with an embodiment of the present invention.

FIG. 5 is a flow diagram illustrating a method for generating a service plan from data needs in accordance with an embodiment of the present invention. At 500, a data need is inspected (as inputted from a data need identifier). At 502, sources of data described in the data need are identified. At 504, properties of identified data are looked up on the source metadata store. At 506, common axes are identified among identified data sources. At 508, required axes are identified from the common axes. This may include, for example, prompting a user to select from a list of common axes. At 510, matching services for the identified data are looked up from the service metadata store. At 512, a plan is generated for supplying data to the identified services.

The following example shows the mashup process detailed above. Table 1 of FIG. 2 shows a snapshot of a possible Personal Metadata store. Table 2 of FIG. 2 shows the snapshot of a possible Service metadata store. Consider a data need that expresses that the user is interested in viewing news stories at the locations that he/she has taken photos.

The data need identifier looks at the data need and identifies that photos and news feed (RSS) have date, time and location as the common attributes. The identified data are now passed onto the service engine.

The service engine looks at the particular attributes in the identified sources (RSS and Photos) and since the data/need specifies that the location is the common attribute to be utilized, it merges the two sources based on location. It also inspects the available services that can consume location information. In this case, it chooses a mapping application that can accept the location parameters and passes it to the service actuator.

The service actuator has the knowledge of how to extract the exact parameters from each of the sources and the mechanism for feeding the attributes to the external service (the map service in this case). The service actuator manages the interaction with the external service and presents the generated mashup to the user.

While aspect of the above mentioned mashup can be easily constructed by an experienced programmer, any mashup that can be created with the technologies available today would essentially be pre-programmed. In contrast, the present invention can accomplish the mashup construction just-in-time based on the dynamic needs of the user.

Figure 6:
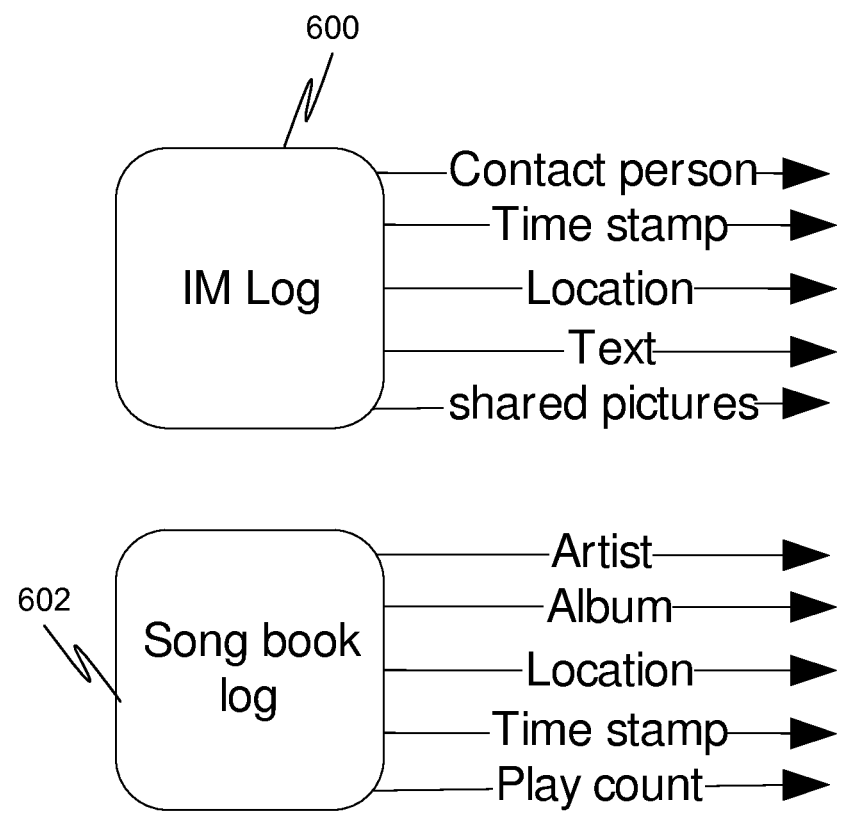
FIG. 6 is a diagram illustrating an example of two data sources in accordance with an embodiment of the present invention.
Figure 7:
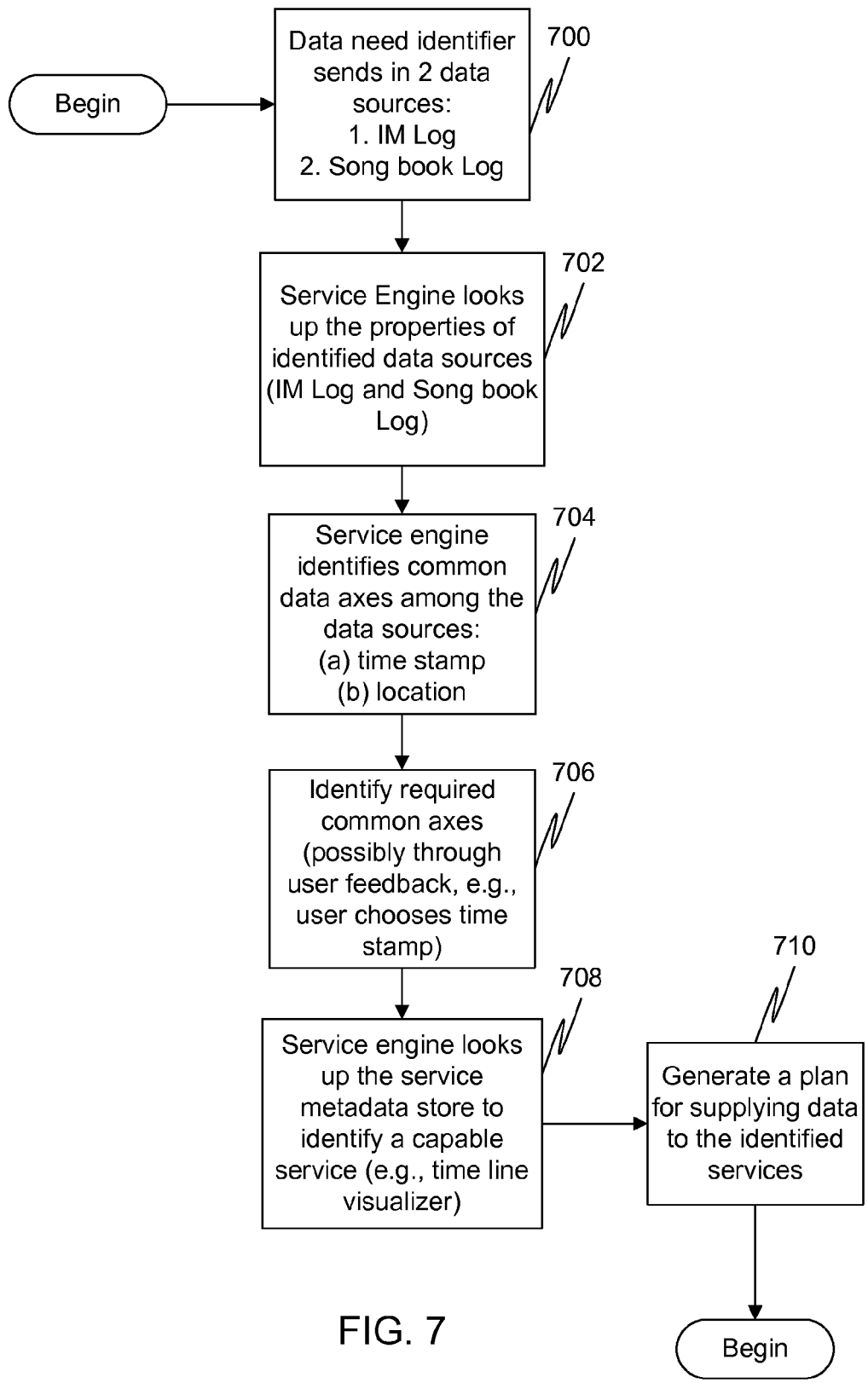
FIG. 7 is a diagram illustrating an example flow in accordance with an embodiment of the present invention.

FIGS. 6 and 7 depict another example of an execution of the personal mashup in accordance with an embodiment of the present invention. FIG. 6 shows two data sources, IM Log 600 and Song book log 602, each of which have 5 data axes. FIG. 7 shows the flow according to this example. At 700, the data need identifier sends in the two data sources. At 703, the service engine looks up the properties of the identified data sources. At 704, the service engine identifies common data axes among the data sources. In this case, the common data axes would be time stamp and location. At 706, required common axes are identified. For example, the user may select time stamp as a required axis. At 708, the service engine looks up the service metadata store to identify a capable service. in this case, for example, an appropriate service for a time stamp data is a time line visualizer. At 710, a plan for supplying the data to the identified services is generated.

Although only a few embodiments of the invention have been described in detail, it should be appreciated that the invention may be implemented in many other forms without departing from the spirit or scope of the invention. Therefore, the present embodiments should be considered illustrative and not restrictive and the invention is not to be limited to the details given herein, but may be modified within the scope and equivalents of the appended claims.

What is claimed is:

1. A computer-implemented method for automated creation of a mashup, the method comprising:
   receiving identifications of sources of data needed to satisfy user data needs;
   running a query on one or more of the sources of data, returning results as output from the running step;
   retrieving metadata relating to the identified sources of data from a source metadata store, wherein the metadata relating to the identified sources of data was placed in the source metadata store by examining actual data received from the identified sources of data to identify details about the data and classify the details into predefined categories of data;
   identifying services to satisfy the data needs by comparing the retrieved metadata of the one or more sources of data on which the query was run to available services to identify one or more services whose input metadata parameters match metadata of the results and whose device parameters match parameters of a user computer;
   retrieving metadata related to the identified services from a service metadata store; and
   automatically supplying results returned as output from the running step as input to the identified services based on the retrieved metadata from the source metadata source and the retrieved metadata from the service metadata source.

2. The method of claim 1, further comprising:
identifying usable metadata from services;
extracting the usable metadata from the services; and
storing the usable metadata in the service metadata store.

3. The method of claim 1, further comprising:
creating a plan for supplying results returned from the identified sources of data to the identified sources of data; and
receiving user approval of the plan prior to the step of automatically supplying results returned from the identified sources of data to the identified services.

4. The method of claim 3, further comprising:
sending the plan to a service actuator, wherein the service actuator looks at the generated plan, identifies required access mechanisms for the involved services, and invokes the services.

5. A computer-implemented method for automated creation of a mashup, the method comprising:
receiving user data needs;
identifying sources of data to satisfy the data needs by comparing the data needs to available data sources accessible by a user computer;
running a query on one or more of the sources of data, returning results as output from the running step;
retrieving metadata relating to the identified sources of data from a source metadata store, wherein the metadata relating to the identified sources of data was placed in the source metadata store by examining actual data received from the identified sources of data to identify details about the data and classify the details into predefined categories of data;
sending the retrieved metadata to another device to identify services to satisfy the data needs by comparing the retrieved metadata of the one or more sources of data on which the query was run to available services to identify one or more services whose input metadata parameters match metadata of the results and whose device parameters match parameters of the user computer, to retrieving metadata related to the identified services from a service metadata store, and to automatically supply results returned as output from the running step as input to the identified services based on the retrieved metadata from the source metadata source and the retrieved metadata from the service metadata source.

6. The method of claim 5, wherein the receiving user data needs includes receiving user data needs from a data needs identifier working with a user interface, wherein the user interface allows user selection of sources of data from a list of data sources in the source metadata store and allows user selection of services from a list of services in the service metadata store.

7. The method of claim 5, wherein the receiving user data needs includes receiving user data needs from a data needs identifier working with an application designed to consume multiple data and services that conveys the application's needs to the data needs identifier.

8. The method of claim 5, further comprising:
identifying usable metadata from data sources;
extracting the usable metadata from the data sources; and
storing the usable metadata in the source metadata store.

9. An apparatus comprising:
a service metadata store maintaining metadata relating to services;
a source metadata store maintaining metadata relating to sources of data;
a service engine coupled to the source metadata store and the service metadata store, wherein the service engine is configured to create a plan for supplying results returned from queries made to identified sources of data to identified services based on information in the source metadata store, the service metadata store and device parameters of a user operated device; and
a service actuator coupled to the service engine, the source metadata store, and the service metadata store, wherein the service actuator is configured to run the plan;
wherein metadata relating to said identified services comprises one or more parameters that match said device parameters and metadata relating to said identified sources of data.

10. The apparatus of claim 9, further comprising a data need identifier coupled to the service engine.

11. The apparatus of claim 9, further comprising a service metadata extractor coupled to the service metadata store and to a service source builder.

12. The apparatus of claim 9, further comprising a user feedback module coupled to the service engine and to the service actuator.

13. The apparatus of claim 9, further comprising a device capability metadata store coupled to the service engine and to the service actuator.

14. An apparatus for automated creation of a mashup, the apparatus comprising:
means for receiving identifications of sources of data needed to satisfy user data needs;
means for running a query on one or more of the sources of data, returning results as output from the running step;
means for retrieving metadata relating to the identified sources of data from a source metadata store, wherein the metadata relating to the identified sources of data was placed in the source metadata store by examining actual data received from the identified sources of data to identify details about the data and classify the details into predefined categories of data;
means for identifying services to satisfy the data needs by comparing the retrieved metadata of the one or more sources of data on which the query was run to available services to identify one or more services whose input metadata parameters match metadata of the results and whose device parameters match parameters of a user computer;
means for retrieving metadata related to the identified services from a service metadata store; and
means for automatically supplying results returned as output from the running step as input to the identified services based on the retrieved metadata from the source metadata source and the retrieved metadata from the service metadata source.

15. The apparatus of claim 14, further comprising:
means for identifying usable metadata from services;
means for extracting the usable metadata from the services; and
means for storing the usable metadata in the service metadata store.

16. The apparatus of claim 14, further comprising:
means for creating a plan for supplying results returned from the identified sources of data to the identified sources of data; and
means for receiving user approval of the plan prior to the step of automatically supplying results returned from the identified sources of data to the identified services.

17. The apparatus of claim 16, further comprising:
means for sending the plan to a service actuator, wherein the service actuator looks at the generated plan, identifies required access mechanisms for the involved services, and invokes the services.

18. An apparatus for automated creation of a mashup, the apparatus comprising:
   means for receiving user data needs;
   means for identifying sources of data to satisfy the data needs by comparing the data needs to available data sources accessible by a user computer;
   means for running a query on one or more of the sources of data, returning results as output from the running step;
   means for retrieving metadata relating to the identified sources of data from a source metadata store, wherein the metadata relating to the identified sources of data was placed in the source metadata store by examining actual data received from the identified sources of data to identify details about the data and classify the details into predefined categories of data;
   means for sending the retrieved metadata to another device to identify services to satisfy the data needs by comparing the retrieved metadata of the one or more sources of data on which the query was run to available services to identify one or more services whose input metadata parameters match metadata of the results and whose device parameters match parameters of the user computer, to retrieving metadata related to the identified services from a service metadata store, and to automatically supply results returned as output from the running step as input to the identified services based on the retrieved metadata from the source metadata source and the retrieved metadata from the service metadata source.

19. The apparatus of claim 18, wherein the means for receiving user data needs includes means for receiving user data needs from a data needs identifier working with a user interface, wherein the user interface allows user selection of sources of data from a list of data sources in the source metadata store and allows user selection of services from a list of services in the service metadata store.

20. The apparatus of claim 18, wherein the means for receiving user data needs includes means for receiving user data needs from a data needs identifier working with an application designed to consume multiple data and services that conveys the application's needs to the data needs identifier.

21. The apparatus of claim 18, further comprising:
   means for identifying usable metadata from data sources;
   means for extracting the usable metadata from the data sources; and
   means for storing the usable metadata in the source metadata store.

\* \* \* \* \*